No. 895,411. PATENTED AUG. 11, 1908.
P. W. AMSTUTZ.
CHECKING AND UNCHECKING ATTACHMENT FOR BRIDLES.
APPLICATION FILED APR. 18, 1903.
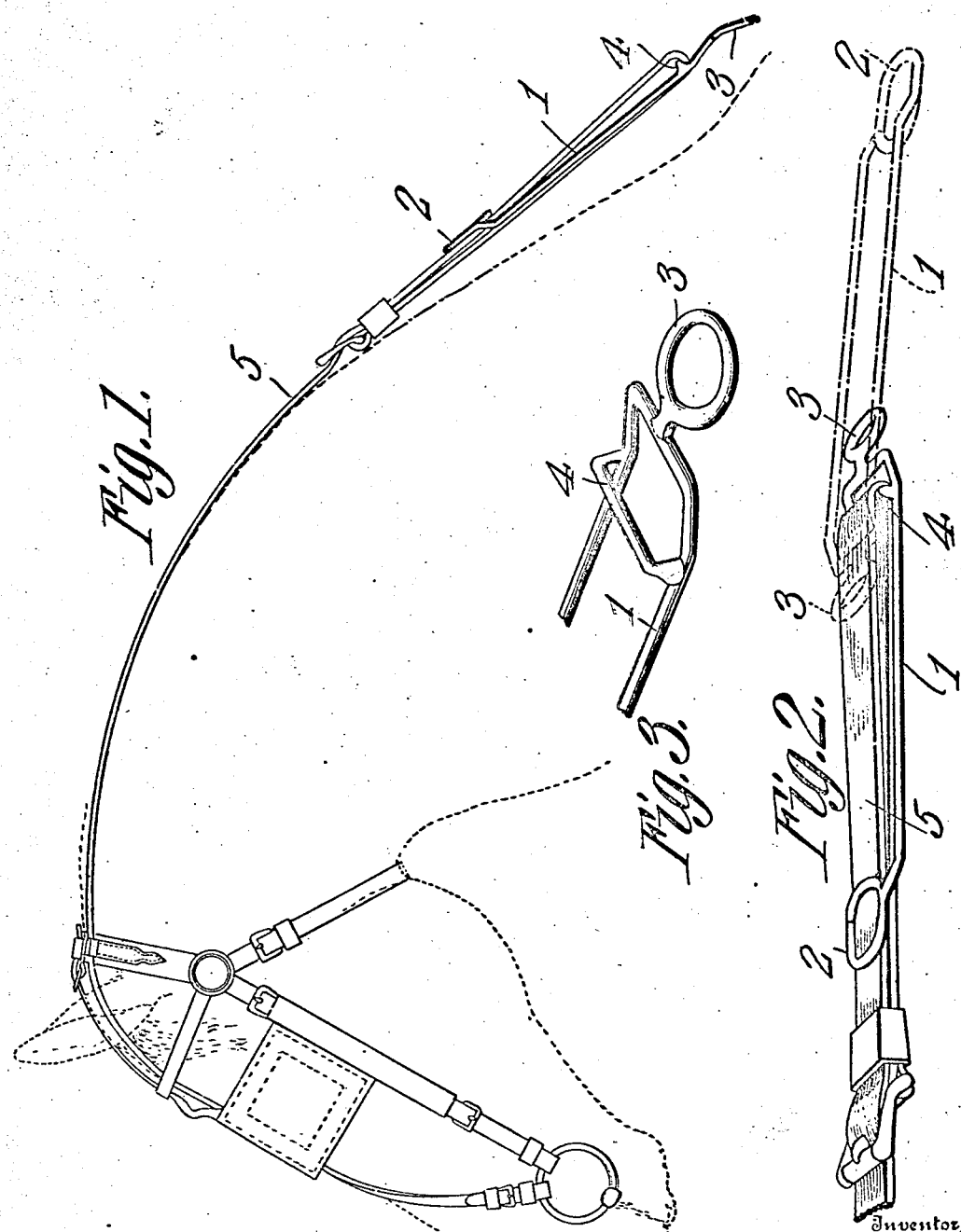

UNITED STATES PATENT OFFICE.

PHILIP W. AMSTUTZ, OF PANDORA, OHIO.

CHECKING AND UNCHECKING ATTACHMENT FOR BRIDLES.

No. 895,411.  Specification of Letters Patent.  Patented Aug. 11, 1908.

Application filed April 18, 1908. Serial No. 427,890.

*To all whom it may concern:*

Be it known that I, PHILIP W. AMSTUTZ, a citizen of the United States, residing at Pandora, in the county of Putnam and State of Ohio, have invented a new and useful Checking and Unchecking Attachment for Bridles, of which the following is a specification.

This invention relates to a checking and unchecking attachment for bridles.

The object of the invention is in a practical, feasible and novel manner, and without necessitating any change in the structural arrangement of a bridle, or of altering the adjustment of any of the parts thereof, to enable the driver to uncheck the horse when tied to a hitching post, thereby to give the animal an opportunity to rest, but at the same time positively preventing the pulling off of the bridle or the dragging of the reins along the ground, and to allow ready rechecking when the animal is again to be driven.

With the above and other objects in view, as will appear as the nature of the invention is better understood, the same consists in the novel construction and combination of parts of a checking and unchecking attachment for bridles, and as will be hereinafter fully described and claimed.

In the accompanying drawings forming a part of this specification, and in which like characters of reference indicate corresponding parts, there is illustrated one embodiment of the invention, capable of practical operation, it being understood that the same idea may be carried into effect in other ways without departing from the invention or from the novelty as defined by the appended claims.

In the drawings, Figure 1 is a view in side elevation of a horse, displaying a bridle positioned thereon equipped with the improvements of the present invention. Fig. 2 is a view in side elevation of the device. Fig. 3 is a fragmentary detail view of a portion of the unchecking and checking device.

The device embodies an approximately rectangular frame, designated generally 1, which may be constructed either of heavy steel or other metallic wire, or of cast metal, such as malleable cast iron. It is designed that the attachment shall be of sufficient length to permit a horse's head, under one adjustment, to drop or lower a sufficient distance to insure rest, and under the other adjustment to hold the horse's head at the desired height. One end of the frame is provided with an upturned terret-hook-engaging loop 2, and the other end with a downturned terret-hook engaging-eye 3, which is herein shown as approximately circular, although this is not essential, as it may be of any other desired contour. Arranged adjacent to the eye 3 is a check-rein holding bar 4, which is preferably integral with the side members of the frame, and extends above the same. The reason for having the terminal 2 of the frame upturned and the terminal 3 downturned is to cause the attachment to lie approximately flat with the check-rein 5, when in use, so that the appearance of the bridle will not be detracted from.

In the use of the device, the check-rein is looped around the bar 4, and is then passed to the bit in the usual manner.

When the animal is traveling, the eye 3 is in engagement with the terret-hook, so that the animal's head will be held at the desired height; but when it is desired to give the animal a rest, as when hitched to a post, or the like, the eye 3 is detached from the terret-hook, and the frame is reversed to bring the loop 2 into engagement with the terret-hook, thereby permitting the animal to drop or lower his head, but at the same time preventing the bridle from becoming detached or the reins from dragging upon the ground.

It will be seen from the foregoing description that the device, as described, will be practical and positive in securing the objects designed, and that its employment will not require any change whatever in the structural arrangement of a bridle.

I claim:—

1. A checking and unchecking attachment for bridles comprising a hollow frame provided each end with terret-hook engaging means, and a check rein engaging member disposed adjacent to one of the said means.

2. A checking and unchecking attachment for bridles comprising a hollow frame having at one end a terret-hook engaging-eye, and adjacent thereto a check-rein engaging member, and at its other end a terret-hook engaging-loop.

3. A checking and unchecking attachment for bridles comprising a hollow frame having at one end a terret-hook engaging-eye, and a check-rein engaging bar arranged adjacent to the eye, and at its other end provided with a terret-ring engaging-loop.

4. A checking and unchecking attachment for bridles comprising a hollow frame having at one end a terret-hook engaging-eye, and adjacent thereto a check-rein engaging-member, and at its other end an upturned terret-hook engaging-loop.

5. A checking and unchecking attachment for bridles comprising a hollow frame having at one end a downturned terret-hook engaging-eye, and a transversely disposed check-rein engaging-bar arranged adjacent to the eye, and at its other end provided with an upturned terret-ring engaging-loop.

6. The combination with a check-rein, of a checking and unchecking attachment therefor comprising a hollow frame having at one end a downturned terret-hook engaging-eye, and a transversely disposed check-rein holding bar arranged adjacent to the eye, and its other end provided with an upturned terret-ring engaging-loop.

In testimony that I claim the foregoing as my own, I have hereto affixed my signature in the presence of two witnesses.

PHILIP W. AMSTUTZ.

Witnesses:
M. E. KRAHN,
H. C. EISENBACH.